(12) United States Patent
Pellikka et al.

(10) Patent No.: US 11,006,088 B1
(45) Date of Patent: May 11, 2021

(54) COLOUR CALIBRATION OF AN IMAGING DEVICE

(71) Applicant: Grundium Oy, Tampere (FI)

(72) Inventors: Matti Pellikka, Lempäälä (FI); Markus Vartiainen, Tampere (FI)

(73) Assignee: Grundium Oy, Tampere, FL (US)

( * ) Notice: Subject to any disclaimer, the term of this patent is extended or adjusted under 35 U.S.C. 154(b) by 0 days.

(21) Appl. No.: 17/087,719

(22) Filed: Nov. 3, 2020

(51) Int. Cl.
| | |
|---|---|
| *H04N 1/60* | (2006.01) |
| *H04N 9/77* | (2006.01) |
| *H04N 9/04* | (2006.01) |
| *H04N 5/235* | (2006.01) |
| *G06T 7/80* | (2017.01) |
| *G06T 7/90* | (2017.01) |
| *G02B 21/00* | (2006.01) |

(52) U.S. Cl.
CPC ............. *H04N 9/77* (2013.01); *G02B 21/008* (2013.01); *G02B 21/0032* (2013.01); *G06T 7/80* (2017.01); *G06T 7/90* (2017.01); *H04N 5/2354* (2013.01); *H04N 9/0451* (2018.08); *G06T 2207/10024* (2013.01); *G06T 2207/10056* (2013.01)

(58) Field of Classification Search
CPC ...... H04N 9/77; H04N 9/0451; H04N 5/2354; G06T 7/90; G06T 7/80; G06T 2207/10056; G06T 2207/10024; G02B 21/0032; G02B 21/008
See application file for complete search history.

(56) References Cited

U.S. PATENT DOCUMENTS

| | | | | |
|---|---|---|---|---|
| 5,734,800 A | * | 3/1998 | Herbert | H04N 1/54 358/1.9 |
| 2002/0131770 A1 | * | 9/2002 | Meier | H04N 1/603 386/302 |
| 2004/0042653 A1 | * | 3/2004 | Hu | G06T 5/007 382/167 |
| 2009/0285480 A1 | * | 11/2009 | Bennett | G06T 5/002 382/167 |
| 2019/0149697 A1 | * | 5/2019 | Novikov | H04N 1/6019 358/518 |

* cited by examiner

*Primary Examiner* — Howard D Brown, Jr.
(74) *Attorney, Agent, or Firm* — Laine IP Oy (57) ABSTRACT

There is provided a method for determining colour correction parameters for a digital imaging device. The method comprises simulating target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device. The method comprises determining a colour correction transformation for transforming the raw values to target values, wherein the colour correction transformation is parametrized by transformation parameters; and solving the transformation parameters for the colour correction transformation using an optimization problem.

20 Claims, 8 Drawing Sheets
(5 of 8 Drawing Sheet(s) Filed in Color)

COLOUR CALIBRATION OF AN IMAGING DEVICE

FIELD

Various example embodiments relate to colour calibration and colour correction in imaging devices, such as in digital microscopes.

BACKGROUND

Various colour spaces exist which define organization of colours. Colour space describes the capabilities of e.g. an image capture device or a display device to reproduce colour information. The colour space identifies a combination of a colour model and a mapping function between the colour model and a reference colour space. Examples of colour models are CIE (created by the International Commission on Illumination known as the Commission Internationale de l'Elcairage i.e. CIE), RGB, YUV and CMYK, etc. Examples of colour spaces are CIE 1931 XYZ, CIELUV, CIELAB and sRGB, etc.

For example, standard Red Green Blue (sRGB) colour space is widely used on computer displays, printers and internet. In order to be able to display an image on a display with correct colours, colour calibration and colour correction are needed.

Digital imaging devices may be calibrated using custom made calibration slides. However, the number of colours is limited.

Therefore, there is a need for a new method for colour correction and imaging device calibration.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided a method for determining colour correction parameters for a digital imaging device, the method comprising: simulating target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device; determining a colour correction transformation for transforming the raw values to target values, wherein the colour correction transformation is parametrized by transformation parameters; and solving the transformation parameters for the colour correction transformation using an optimization problem.

According to a second aspect, there is provided a non-transitory computer readable medium having stored thereon a set of computer readable instructions that, when executed by at least one processor, cause an apparatus to perform at least: simulating target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device; determining a colour correction transformation for transforming the raw values to target values, wherein the colour correction transformation is parametrized by transformation parameters; and solving the transformation parameters for the colour correction transformation using an optimization problem.

According to a third aspect, there is provided digital imaging device, configured to receive transformation parameters for a colour correction transformation, wherein the transformation parameters are solved according to a method comprising; simulating target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device; determining a colour correction transformation for transforming the raw values to target values, wherein the colour correction transformation is parametrized by transformation parameters; and solving the transformation parameters for the colour correction transformation using an optimization problem; and the digital imaging device is further configure to apply the colour correction transformation with the transformation parameters to an image captured by the digital imaging device to obtain a colour corrected image.

According to a further aspect, there is provided an apparatus comprising means for performing simulating target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device; determining a colour correction transformation for transforming the raw values to target values, wherein the colour correction transformation is parametrized by transformation parameters; and solving the transformation parameters for the colour correction transformation using an optimization problem.

According to an embodiment, the apparatus comprises means for providing the transformation parameters to the digital imaging device.

According to an embodiment, the colour correction transformation has a form of a second order polynomial.

According to an embodiment the optimization problem is based on a loss function that measures a difference between the target values and transformed values, wherein the transformed values are obtained by applying the determined colour correction transformation to the raw values.

According to an embodiment, the loss function is a squared 2-norm of the difference between the target values and the transformed values.

According to an embodiment, the simulated target and raw value pairs are represented in CIELAB colour space.

According to an embodiment, an image sensor of the digital imaging device is the monochrome sensor, and the illumination spectra comprises spectra of at least three different narrowband light sources.

According to an embodiment, an image sensor of the digital imaging device is the colour sensor, and the sensitivity spectra comprises at least three different spectra comprising combined spectral responses of colour filters and pixels of the colour sensor; and the illumination spectrum is of a broadband light source.

According to an embodiment, the light source comprises one or more light emitting diodes.

According to an embodiment, the digital imaging device is a microscope or microscope scanner.

According to an embodiment, the apparatus comprises means for validating the obtained parameters for the colour correction transformation using target and raw value pairs determined using a calibration target.

According to an embodiment, the apparatus comprises means for simulating a subset of raw values to be included in the simulated raw values, wherein the subset of raw values is simulated based on pre-determined sample transmission spectra of the set of colours; a modified sensitivity spectrum or spectra of the image sensor; a modified illumination spectrum or spectra of the light source.

According to an embodiment, a number of colours in the set of colours is at least a number of the transformation parameters for the colour correction transformation divided by three.

According to an embodiment, the means comprises at least one processor; and at least one memory including computer program code, the at least one memory and the computer program code configured to, with the at least one processor, cause the performance of the apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Let us consider imaging devices, such as digital microscopes or microscope scanners. In microscopes, monochrome sensors together with narrowband illumination may be used to avoid the degradation of image quality by chromatic aberration. In brightfield microscopy, for example, the sample may be illuminated with light emitting diode (LED) based light source alternately with red (R), green (G), and blue (B) light, and the corresponding digital values are recorded. Thus, three values are acquired per pixel.

It is of great importance to produce images with correct colours according to existing standards. For example, in histology, pathology, or food processing, etc. it is often relied on accuracy of the colours and/or change in colours when processing and investigating the images of the samples. In addition, the captured or scanned images may be used to train an image classifier employing machine learning, and therefore, the colours in the images should be consistent and comparable.

CIELAB (or CIE L*a*b*) colour space expresses colours as three values: L* for lightness of the colour from black to white, a* for colour's position between green and red/magenta, and b* for colour's position between blue and yellow. CIELAB is designed to approximate human vision, and its perceptual uniformity means that a change of the same amount in a numerical colour value should produce a change of the same amount when perceived visually. This makes CIELAB a good and feasible choice to compare colours of images acquired using digital microscope. Even though the comparison of values, e.g. for research purposes, would be carried out based on the CIELAB representation, the images may be displayed on a display screen for visualization purposes based on sRGB representation.

CIELAB colour space representation may be obtained from the CIE 1931 XYZ colour space representation, which links distributions of wavelengths ($\lambda$) in the electromagnetic visible spectrum with physiologically perceived colours in human colour vision.

Given a transmission spectrum T($\lambda$) of a sample, its CIE 1931 XYZ colour space representation is given by $$X = \frac{1}{N} \int I(\lambda) T(\lambda) x(\lambda) d\lambda, \tag{1}$$

$$Y = \frac{1}{N} \int I(\lambda) T(\lambda) y(\lambda) d\lambda, \tag{2}$$

$$Z = \frac{1}{N} \int I(\lambda) T(\lambda) z(\lambda) d\lambda, \tag{3}$$

where $N = \int I(\lambda) y(\lambda) d\lambda$ holds, and
wherein I($\lambda$) is the illuminant spectrum, and the functions x($\lambda$), y($\lambda$), and z($\lambda$) are the CIE colour matching functions. A typical reference illuminant I($\lambda$) is the CIE standard illuminant D65, which is intended to represent average daylight and has a correlated colour temperature of approximately 6500 K. However, other reference illuminants may be applied, e.g. D50.

Figure 1:
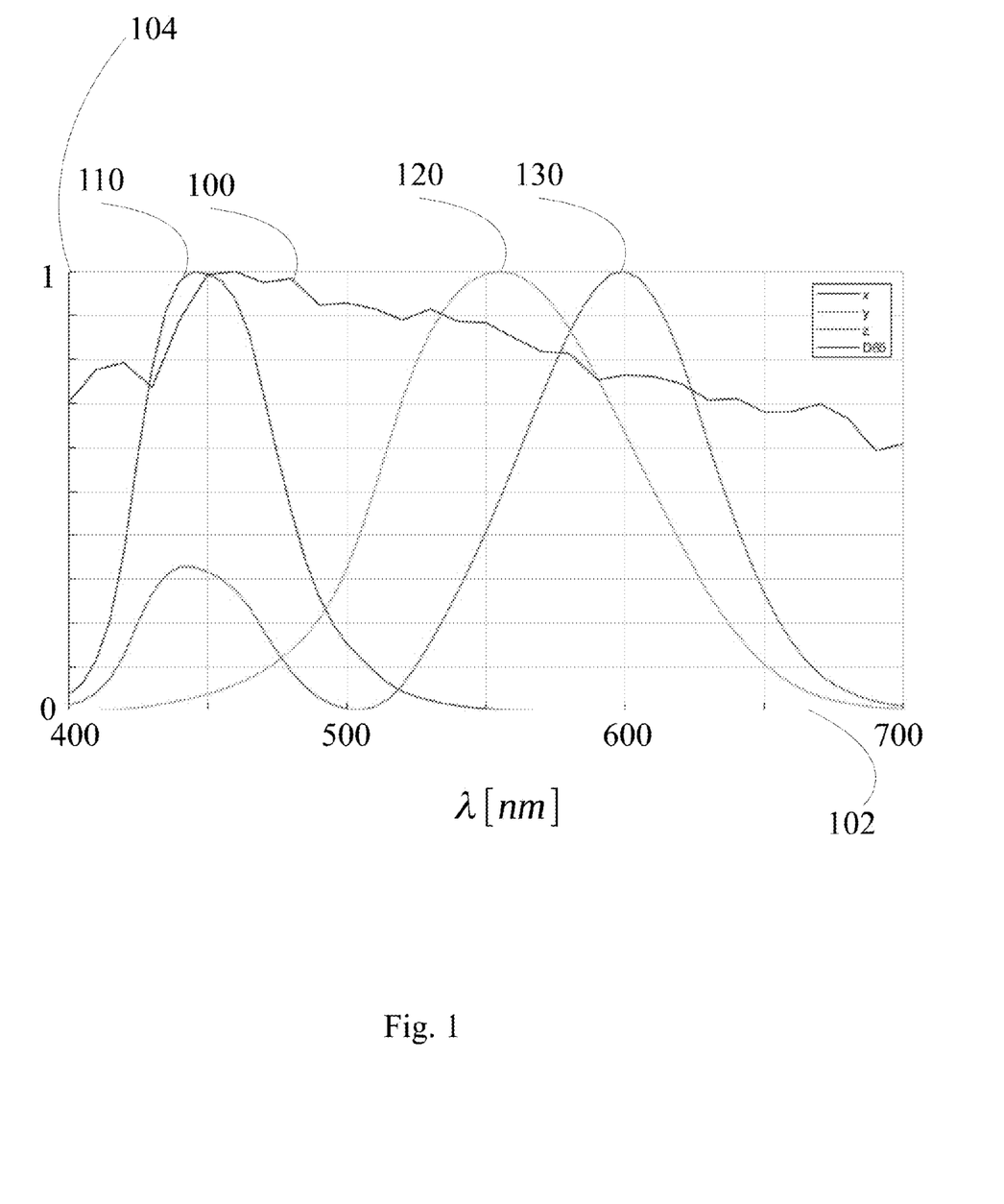
FIG. 1 shows, by way of an example, CIE colour matching functions and standard D65 spectrum.

FIG. 1 shows, by way of example, CIE colour matching functions 110, 120, 130 and the standard 6500 K daylight spectrum 100 (D65). Colour matching function x($\lambda$) 110 is for blue, function y($\lambda$) 120 is for green, and function z($\lambda$) 130 is for red. X-axis 102 represents wavelength in nanometres (nm), and the y-axis 104 represents normalized intensity.

From the XYZ representation, the CIELAB colour space representation is obtained with $$L = 116 f\left(\frac{Y}{Y_n}\right) - 16, \tag{4}$$

-continued $$a = 500\left(f\left(\frac{X}{X_n}\right) - f\left(\frac{Y}{Y_n}\right)\right), \quad (5)$$

$$b = 200\left(f\left(\frac{Y}{Y_n}\right) - f\left(\frac{Z}{Z_n}\right)\right), \text{ where for } f(t) \quad (6)$$

$$f(t) = \begin{cases} \sqrt[3]{t}, & \text{if } t > \delta^3 \\ \frac{t}{3\delta^2} + \frac{4}{29}, & \text{otherwise} \end{cases} \quad (7)$$

and $$\delta = \frac{6}{29}$$

holds. For the D65 illuminant, $X_n$=0.950489, $Y_n$=1, $Z_n$=1.088840 holds.

Figure 2:
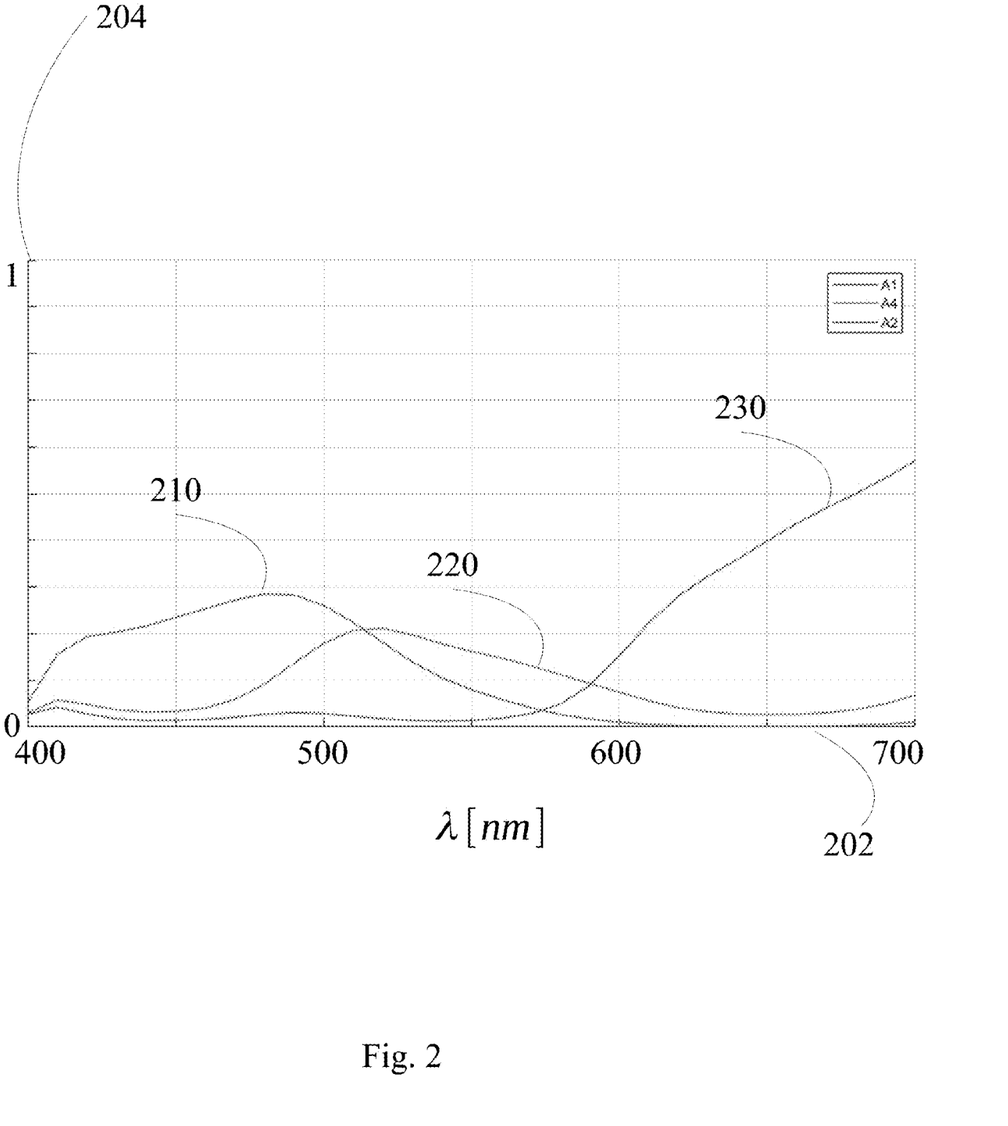
FIG. 2 shows, by way of an example, transmission spectra from a calibration target.

FIG. 2 shows, by way of example, transmission spectra $T(\lambda)$ 210, 220, 230 from a calibration target, which are obtained by illuminating the sample with red, green, and blue LEDs. Transmission spectrum 210 is for blue light, transmission spectrum 220 is for green light and transmission spectrum 230 is for red light. X-axis 202 represents wavelength in nanometres (nm), and the y-axis 204 represents normalized intensity. Given the illuminant spectrum $I(\lambda)$, sample transmission spectrum $T(\lambda)$, and the image sensor sensitivity spectrum $S(\lambda)$, the recorded digital value C by the image sensor is given by $$C = k\int I(\lambda)T(\lambda)S(\lambda)d\lambda + b, \quad (8)$$

where k is the total gain factor depending on the sample exposure, optical transmission, and sensor analog gain. The total gain factor k is specific for the imaging system, and it may be pre-defined. For example, k may be defined by adjusting brightness of the LED and/or exposure time. The k may be defined such that the dynamic range of the sensor is optimally exploited, and that the areas of the captured target without any sample appear colourless in the resulting image. The areas without any sample show uniform $T(\lambda)$, i.e. they equally attenuate all wavelengths of light. The constant b is the sensor black level, i.e. the value recorded by the sensor when no photons hit the sensor. The sensor sensitivity spectrum $S(\lambda)$, or spectral response of the sensor, may be obtained by measurements of narrowband illumination, centered at different wavelengths. In this example, the noise inherent to image sensors and optical emission have been omitted. The value C represents the intensity recorded by a pixel.

Figure 3:
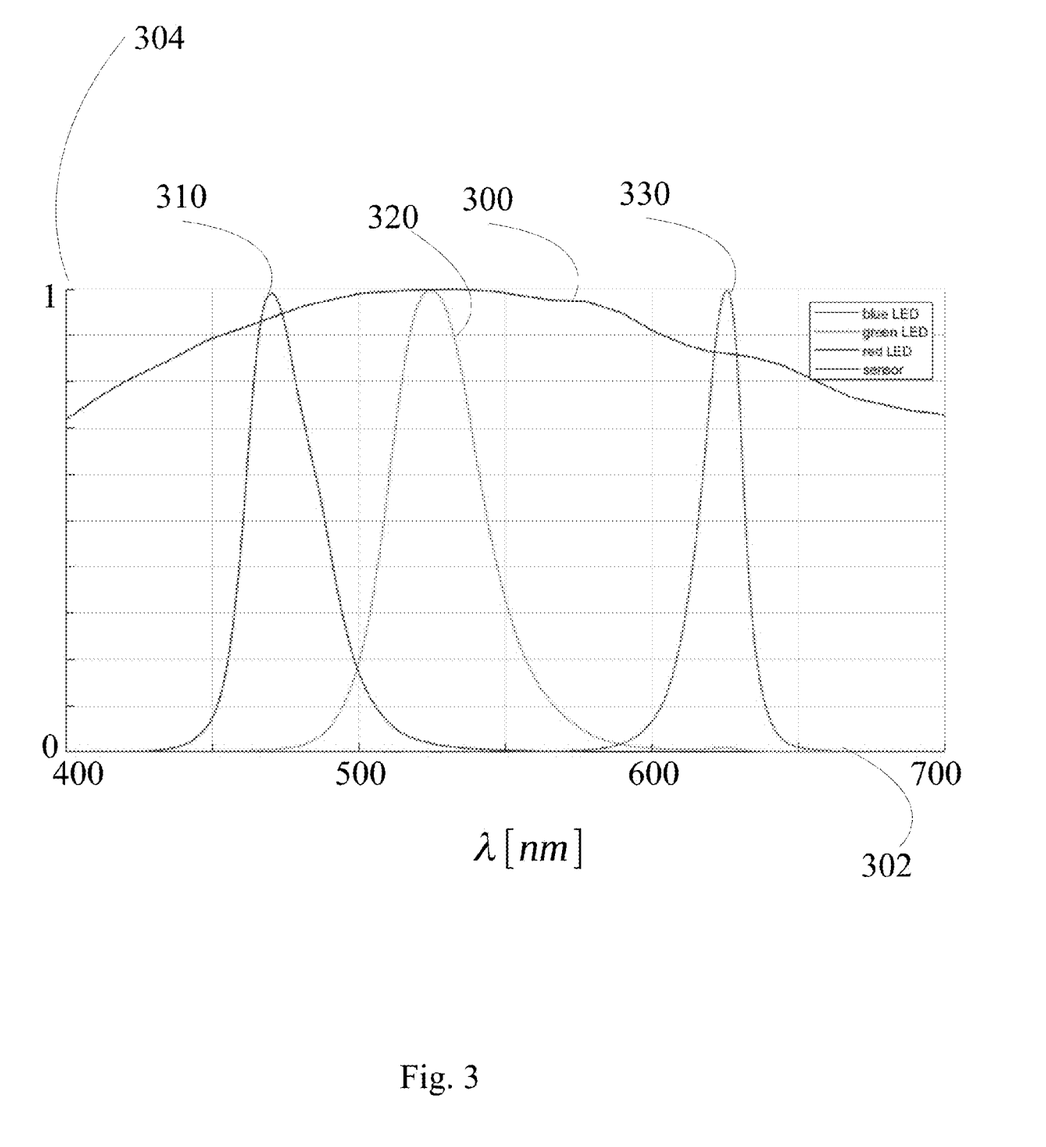
FIG. 3 shows, by way of an example, LED illumination spectra and a sensor sensitivity spectrum of a monochrome sensor.

As described above, the sample, e.g. a calibration target, may be illuminated with red, green, and blue LEDs in succession. The monochrome sensor records the corresponding digital values R, G, and B. The black level b is subtracted. Thus, we have digital values for different colors:

$$R = k\int I_R(\lambda)T(\lambda)S(\lambda)d\lambda - b, \quad (9)$$

$$G = k\int I_G(\lambda)T(\lambda)S(\lambda)d\lambda - b, \quad (10)$$

$$B = k\int I_B(\lambda)T(\lambda)S(\lambda)d\lambda - b, \quad (11)$$

where $I_R(\lambda)$, $I_G(\lambda)$, and $I_B(\lambda)$ denote the emission spectra or illumination spectra of the red, green, and blue LEDs, respectively. FIG. 3 shows, by way of example, LED illumination spectra $I_R(\lambda)$ 330, $I_G(\lambda)$ 320, and $I_B(\lambda)$ 310, and sensor sensitivity spectrum $S(\lambda)$ 300 of a monochrome sensor. X-axis 302 represents wavelength in nanometres (nm), and the y-axis 304 represents normalized intensity. LED illumination spectra and sensor sensitivity spectrum are known or pre-determined. They may be e.g. empirically determined, or the information may be provided by manufacturer of the light source and/or the imaging sensor. Illumination spectrum may be measured e.g. using a spectrometer.

The resulting digital values, i.e. the values R, G and B, are raw values, and they may be interpreted to correspond, for example, the red, green, and blue values in RGB colour model. For example, the values may be interpreted as values in the sRGB colour space without gamma correction, i.e. as linear RGB values. Then, the corresponding CIE 1931 XYZ colour space representation corresponding to the D65 illuminant may be computed from $$\begin{bmatrix} X \\ Y \\ Z \end{bmatrix} = \begin{bmatrix} 0.41239080 & 0.35758434 & 0.18048079 \\ 0.21263901 & 0.71516868 & 0.07219232 \\ 0.01933082 & 0.11919478 & 0.95053215 \end{bmatrix} \begin{bmatrix} R \\ G \\ B \end{bmatrix}. \quad (12)$$

The 3×3 matrix above is a colour transformation matrix given by the official sRGB specification.

From CIE 1931 XYZ representation, the CIELAB colour space representation, i.e. L, a, and b, of the recorded digital values may be computed as described above.

It is to be noted that the colour space, to which the recorded digital values are interpreted to correspond, may be arbitrarily chosen. Different choice of a colour space will lead to a different colour transformation into a CIELAB colour space. For example, the initial representation may be chosen so that the resulting colour transformation will be as simple as possible into the CIELAB colour space.

The raw colour values do not yet correspond to any colour calibration. The raw colour values are to be corrected using a colour correction transformation.

Given a set of target (y) and raw (x) CIELAB colour space representation pairs ($y_1$, $x_1$) (i denotes a colour) comprising their L, a, and b components, a colour correction transformation $y=f(x)$ may be determined that brings the values of L, a, and b in $x_i$ close to their target values in $y_i$. Obtaining the target and raw value pairs will be described later.

When the form of the transformation $f$ is chosen beforehand, and is parametrized by w, an optimization problem, e.g. a minimization problem, may be formulated to find the parameters w:

$$\min_w \sum_i L(f(x_i, w) - y_i), \quad (13)$$

where L is a loss function that measures the difference between the target values $y_i$ and the transformed values $f(x_i, w)$.

For example, the loss function may be chosen to be squared 2-norm of the difference between the target values and the transformed values. The transformation may be chosen to be e.g. a second order polynomial. Then, we have a minimization problem $$\min_w \sum_i \|f(x_i, w) - y_i\|^2, \quad (14)$$

where $$f(x, w) = \begin{bmatrix} w_1 & w_2 & w_3 & w_4 & w_5 & w_6 & w_7 & w_8 & w_9 & w_{10} \\ w_{11} & w_{12} & w_{13} & w_{14} & w_{15} & w_{16} & w_{17} & w_{18} & w_{19} & w_{20} \\ w_{21} & w_{22} & w_{23} & w_{24} & w_{25} & w_{26} & w_{27} & w_{28} & w_{29} & w_{30} \end{bmatrix} \begin{bmatrix} L^2 \\ La \\ Lb \\ a^2 \\ b^2 \\ ab \\ L \\ a \\ b \\ 1 \end{bmatrix} \quad (15)$$

holds. In the CIELAB colour space, the 2-norm of the difference $f(x_i, w) - y_i$ corresponds to the perceptual difference between the colours. Therefore, the choice of this loss function is justified.

When it comes to the choice of the form of the transformation $f$, it may be made on the basis of a suitable trade-off between bias and variance. For example, the second order polynomial mentioned above does not overfit to the sample data but adapts better to the data than for example a linear transformation.

Target and raw value pairs $(y_i, x_i)$ for the above minimization procedure to determine the transformation parameters w may be obtained e.g. by a measurement method.

In the measurement method, a calibration target is measured. When purchasing a digital microscope, it is usually delivered with a specific colour transmission calibration slide, i.e. the calibration target. The slide comprises a number of colour patches of different colours which are individually calibrated to correspond given colour space values, e.g. sRGB values. The spectral transmission response for different wavelengths is known for each colour patch. The calibration slide may be used to calibrate the microscope and thus enable colour correction of the acquired images. For example, a datasheet of the calibration slide specifies the target values $y_i$, and the device or microscope under calibration may be used to determine the raw values $x_i$ for each colour patch. Then, the transformation needed to transform the raw value into target values may be solved.

However, the use of the slide may be excess work for a user of the microscope, and the sample set is limited by the number of the colour patches on the slide. The sample colours are predetermined by the manufacturer of the calibration target.

There is provided a method for determining colour correction parameters for a digital imaging device. The method employs a simulation method for obtaining target and raw value pairs $(y_i, x_i)$ for the above minimization procedure to determine the transformation parameters w.

Figure 4:
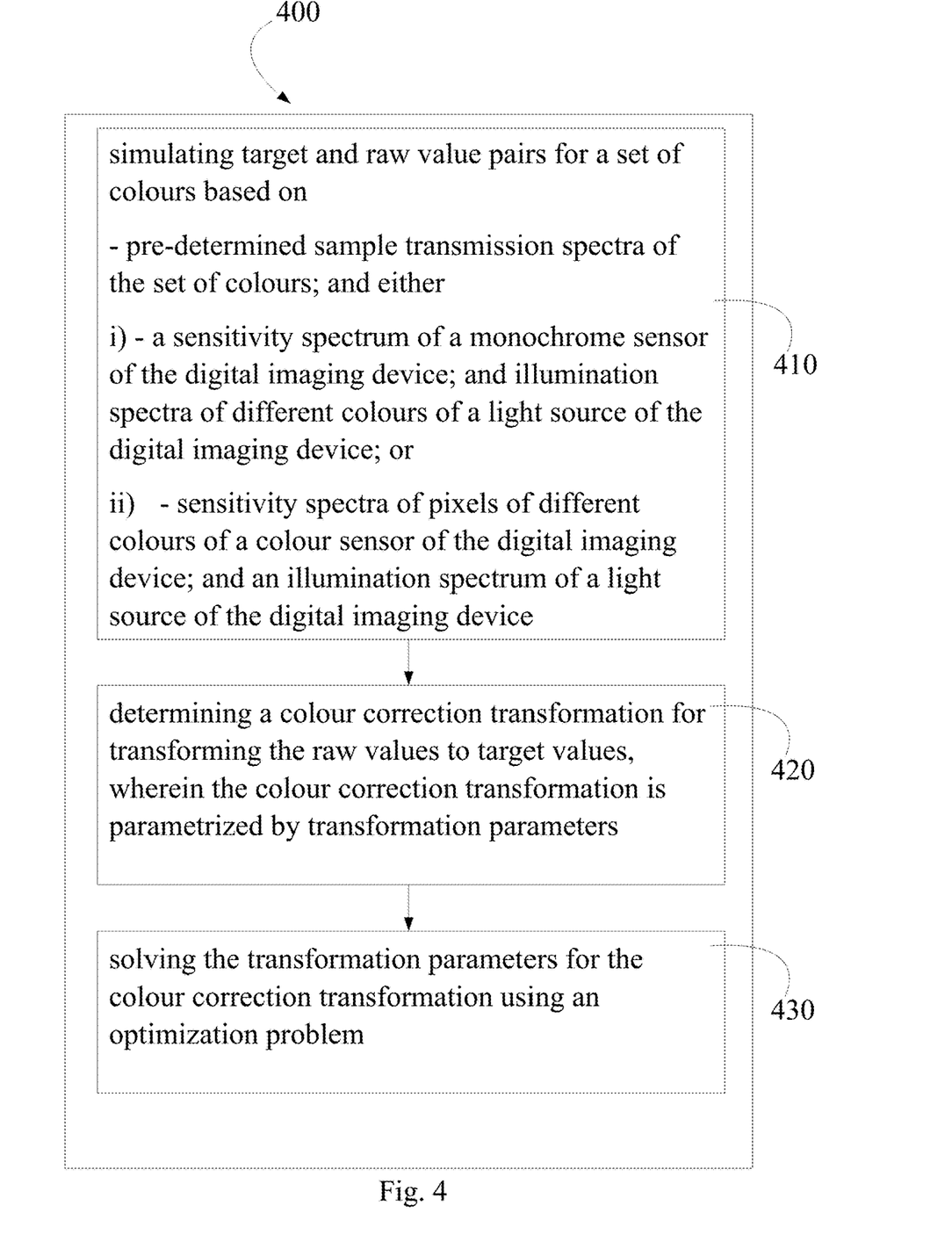
FIG. 4 shows, by way of an example, a flowchart of a method.

FIG. 4 shows, by way of example, a flowchart of a method 400 for determining colour correction parameters for a digital imaging device. The phases of the method may be performed by the apparatus 700 of FIG. 7, e.g. by a computer, e.g. the computer 810 of FIG. 8A. The method 400 comprises simulating 410 target and raw value pairs for a set of colours based on pre-determined sample transmission spectra of the set of colours; i) a sensitivity spectrum of a monochrome sensor of the digital imaging device; and illumination spectra of different colours of a light source of the digital imaging device; or ii)—sensitivity spectra of pixels of different colours of a colour sensor of the digital imaging device; and an illumination spectrum of a light source of the digital imaging device. The method 400 comprises determining 420 a colour correction transformation for transforming the raw values to target values, wherein the colour correction transformation is parametrized by transformation parameters. The method 400 comprises solving 430 the transformation parameters for the colour correction transformation using an optimization problem.

In the simulation method, target and raw value pairs $(y_i, x_i)$ are determined by simulating with sample transmission spectra of a set of colours, and using a known device image sensor sensitivity spectrum/spectra, and known illumination spectrum/spectra of a light source of the digital imaging device.

For example, in case of a monochrome sensor, the illumination spectra comprises at least three spectra, e.g. $I_R(\lambda)$, $I_G(\lambda)$, and $I_B(\lambda)$ of the device light source, e.g. LED. The spectra are narrowband spectra, and together they may cover, approximately or wholly, the visible spectrum, i.e. the portion of the electromagnetic spectrum that is visible to the human eye. This enables producing images with colour resolution suitable for human eye. Correspondingly, the image sensor sensitivity spectrum may cover, approximately or wholly, the visible spectrum.

In case of a colour sensor, the illumination spectrum comprises spectrum of a broadband light source. This spectrum may cover, approximately or wholly, the visible spectrum. The image sensor sensitivity spectra comprise at least three narrowband spectra which may together cover, approximately or wholly, the visible spectrum.

A set of colours may comprise any number of colours, but at least number of parameters w of the transformation $f$ divided by three. For example, if the number of parameters w is 30 as in the example above, the minimum number of the colours would be 30/3, i.e. 10.

Sample transmission spectra of a set of colours may be pre-determined or obtained e.g. by generating the spectra or measuring spectra of different colour targets. For example, spectra of different colour patches of a calibration slide may be measured, and additionally compute spectra based on linear combinations of the spectra of the colour patches. Different weight factors ($\neq 0$) may be used for the combinations. For example, different brightness levels of a colour may be achieved using a weight factor.

Obtaining the transmission spectra of a set of colours via generation, a distribution such as normal or Gaussian distribution may be applied in the generation procedure. For example, Gaussian distribution may be applied with a mean value of 400 nm to 700 nm, and a standard deviation of 10 nm to 300 nm.

The method disclosed herein enables calibration without actual imaging of any calibration target or calibration slide. Any transmission spectrum may be simulated, so the sample set size is unlimited, and the colour distribution of the sample set is unrestricted. Sample set may be weighted according to various needs of different applications. For example, one may weigh the sample set to contain a lot of samples around typical colours in a certain application of the device. Colour profiles may be determined according to the application. For example, in case of microscope scanners, colours close to a specific stain may be weighted.

The method discloses herein enables simulating the sensitivity of the determined transformation on device specific variations that affect the produced colour. For example, it may be simulated with modified spectrum or spectra how slight changes in the sensor sensitivity spectrum or spectra and/or in the illuminant spectrum or spectra affect the final colour representation $f(x, w)$. Typically, variation of a monochrome sensor sensitivity spectrum has little effect, as the monochrome sensor typically has wide and flat response. However, LED illumination spectra may have narrow bands, and the variation of their peak location may have a large effect on the final colour representation.

Colour correction parameters determined by the method as disclosed herein may be useful in imaging devices, wherein the optical path from a known light source to a known camera sensor is under control or may be controlled. This means that the spectrum or spectra of the light source are known, the spectrum or spectra of the sensor is known, and no light from the surroundings may enter the system in such a way that the amount of light that propagates to the sensor would change e.g. due to reflections. In microscopes, for example, the conditions are suitable for the method as discloses herein to be used. If the light source of the device is changed, the colour calibration of the device is to be repeated.

Figure 5:
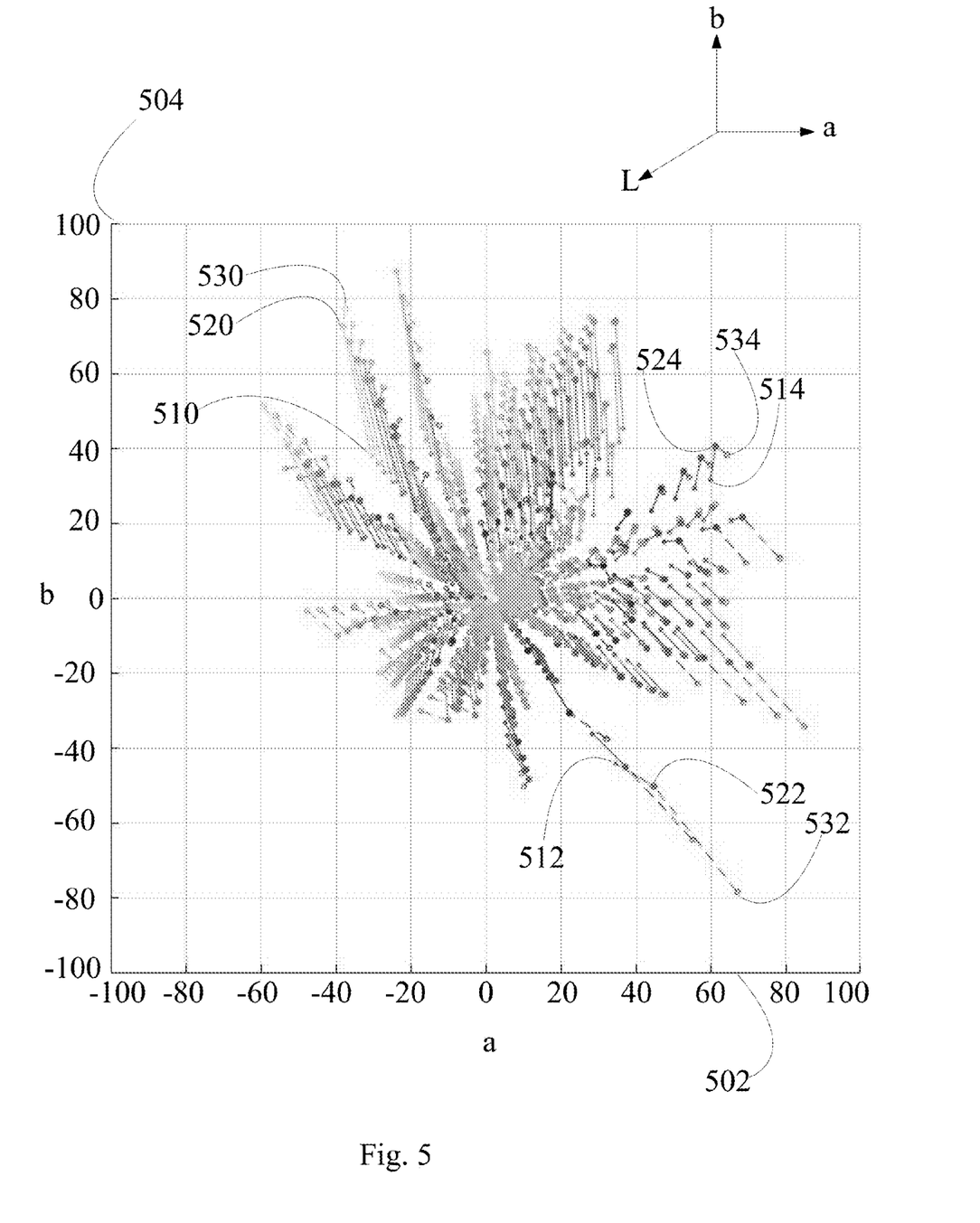
FIG. 5 shows, by way of example, a colour correction transformation visualization in CIELAB space.

FIG. 5 shows, by way of example, a colour correction transformation visualization in CIELAB space. X-axis 502 represents the value a, y-axis 504 represents the value b, and the value L is represented by the axis which is orthogonal to the (a,b)-plane. For each sample i in the sample set, three dots are visualized: $x_i$, $f(x_i, w)$, and $y_i$. The small filled dots, e.g. dots 510, 512, 514, represent the raw (L, a, b) colour space values $x_i$, the large filled dots, e.g. dots 520, 522, 524 represent the result values, i.e. transformed (L, a, b) colour space values $f(x_i, w)$, and the small hollow dots, e.g. dots 530, 532, 534 represent the target (L, a, b) colour space values $y_i$.

Figure 6:
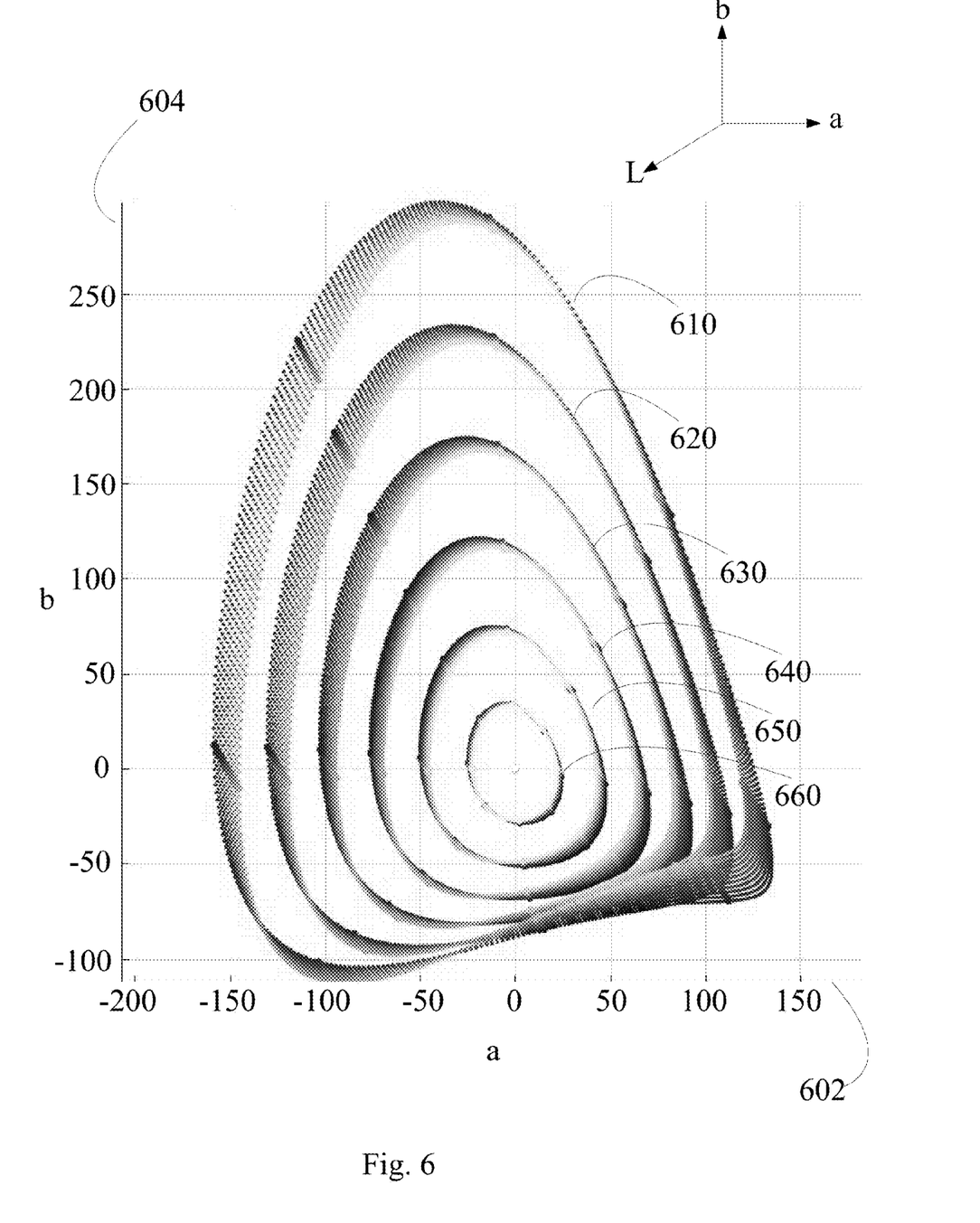
FIG. 6 shows, by way of example, a colour correction transformation visualization in CIELAB space.

FIG. 6 shows, by way of example, a colour correction transformation visualization in CIELAB space. X-axis 602 represents the value a, y-axis 604 represents the value b, and the value L is represented by the axis which is orthogonal to the (a,b)-plane. The points represent how circles 610, 620, 630, 640, 650, 660 in the source or raw (L, a, b) colour space map to the target (L, a, b) colour space, projected to the (a, b)-plane. The outermost circle 610 in source space had a radius of 100. In the example of FIG. 6, the colour correction greatly amplifies the green and yellow hue colour saturation while blue hue colour saturation is less amplified.

According to an embodiment, a subset of raw values $X_i=\{x_{ij}\}$ that correspond to the same sample colour, may be included for each sample transmission spectrum $T_i(\lambda)$. The subset of raw values may be produced by modifying, e.g. by applying slight variations to, the sensor sensitivity and the LED illumination spectrum or spectra, while still requiring them to produce the same target values $y_i$, corresponding to the given transmission spectrum $T_i(\lambda)$. This way, the robustness of the determined colour correction transformation against device variation may be increased.

The measurement method and the simulation method to obtain the target and raw value pairs may be used in tandem. For example, the transformation parameters may be solved using the simulated target and raw value pairs, and then validated using the target and raw value pairs determined using a calibration target.

Figure 7:
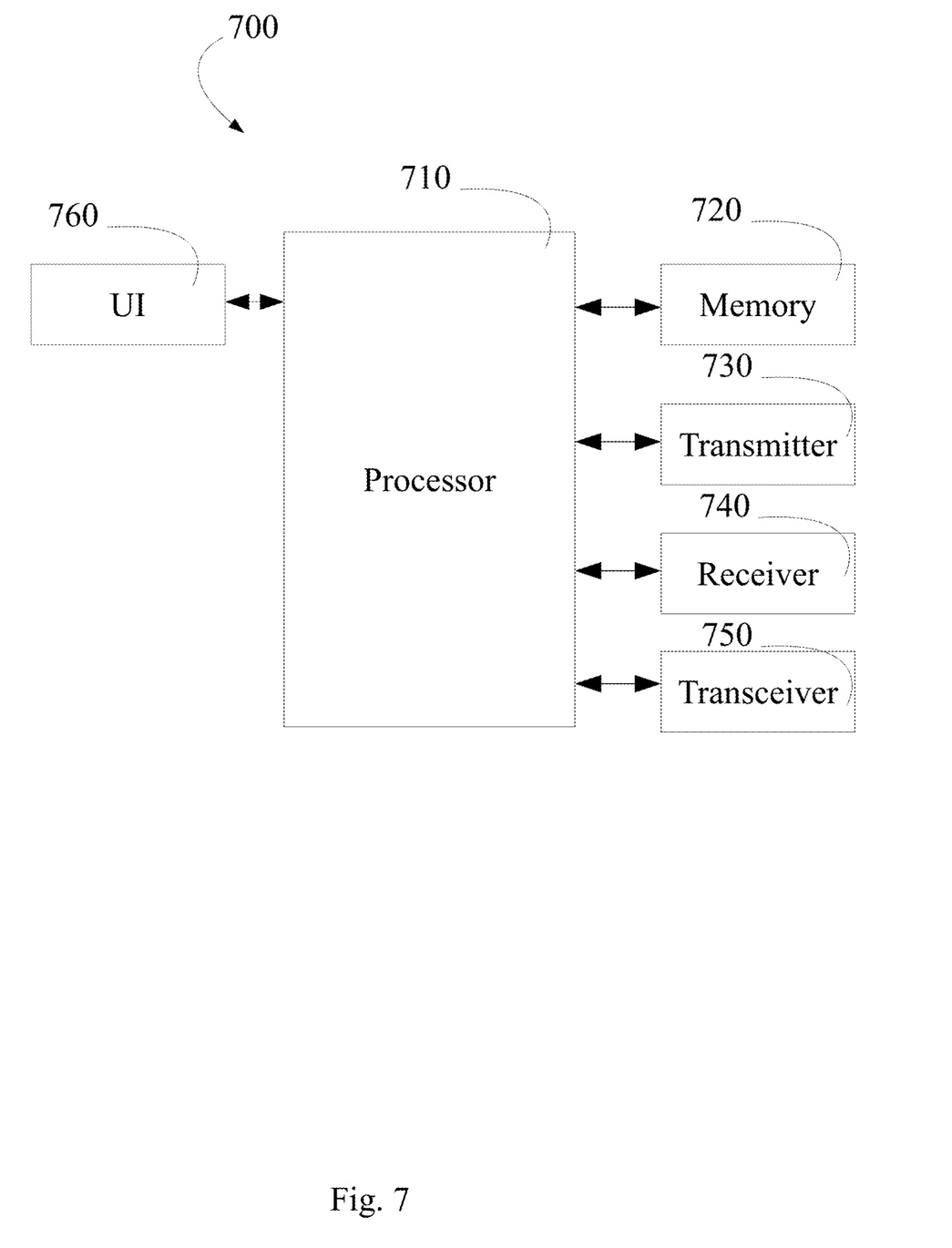
FIG. 7 shows, by way of example, a block diagram of an apparatus.

FIG. 7 shows, by way of an example, a block diagram of an apparatus 700. The apparatus may perform the method as presented herein. The apparatus may be e.g. a computer, or may be comprised in a computer. The apparatus may comprise a circuitry, such as a chip, a chipset or a microcontroller. The determined parameters or the colour correction transformation with the parameters may be provided to a digital imaging device, e.g. a digital microscope or a microscope scanner. The determined parameters or the colour correction transformation with the parameters may be stored in a memory of the digital imaging device, or the digital imaging device may be configured to retrieve the parameters and/or the colour correction transformation with the parameters from a memory, e.g. external memory, e.g. from a cloud.

Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be means for performing method steps in device 700. Processor 710 may be configured, at least in part by computer instructions, to perform actions.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, and a touchscreen. A user may be able to operate device 700 via UI 760, for example to start the calibration procedure. If, for example, lighting conditions change, e.g. the light source changes, the calibration need to be repeated to obtain correct transformation parameters for changed lighting conditions.

Figure 8A:
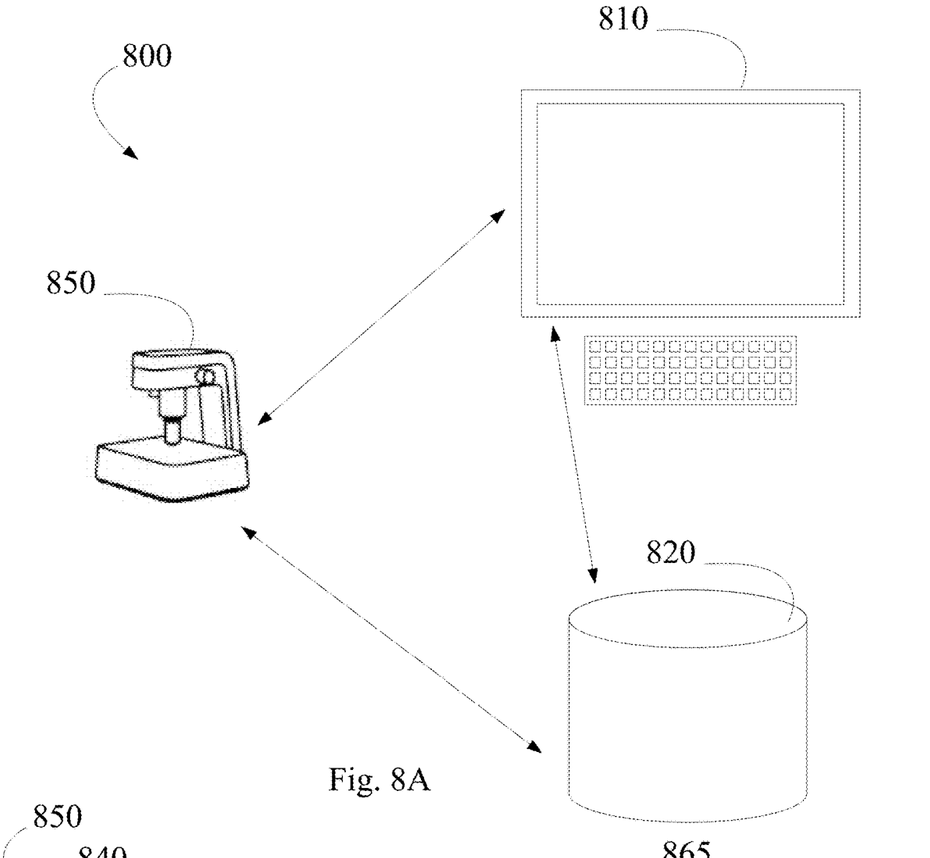
FIG. 8A shows, by way of example, system and devices for colour calibration of an imaging device.

FIG. 8A shows, by way of example, system 800 and devices for colour calibration of an imaging device 850. The imaging device 850 may be e.g. a digital imaging device such as a digital microscope scanner. The scanner may be a light weight portable scanner. The scanner may communicate with other devices, e.g. a computer 810 and a server 820. The scanner may communicate with other devices e.g. utilising 5G connectivity, or other suitable communication. Communication may be wired or wireless. The apparatus 810, e.g. a computer, may be the apparatus or device 700 of FIG. 7. The transformation parameters w for the colour correction transformation may be determined or solved using the method discloses herein by the apparatus 810. The solved parameters may be provided to the imaging device 850. The solved parameters may be provided e.g. by transmitting the parameters wirelessly via communication connection to the imaging device, or wiredly. The parameters may then be stored into memory of the imaging device. The transformation function $f$ may be stored, e.g. beforehand, in the memory of the imaging device, and the imaging device may receive the parameters for $f$ from the apparatus 810. Or if the parameters are stored in the memory of the imaging device, the imaging device may receive or retrieve the parameters from the memory of the imaging device. Alternatively, the solved parameters may be stored in an external memory, e.g. in the server 820, and the imaging device 850 may retrieve the parameters from the server 820.

The imaging device 850 may be configured to capture one or more images, and apply the colour correction transformation with the solved transformation parameters to the one or more images to obtain one or more colour corrected images. Alternatively, the imaging device may capture one or more images, transmit the one or more images to another apparatus, e.g. the apparatus 810. Then, the other apparatus, e.g. apparatus 810, may apply the colour correction transformation with the solved transformation parameters to the one or more images to obtain one or more colour corrected images. Within any of the embodiments presented herein, the colour correction transformation with the solved transformation parameters may be applied to one or more images by a digital imaging device or an apparatus which may have a communication connection with the digital imaging device. The method presented herein may comprise applying the colour correction transformation with the solved transformation parameters to one or more images captured by the digital imaging device.

Figure 8B:
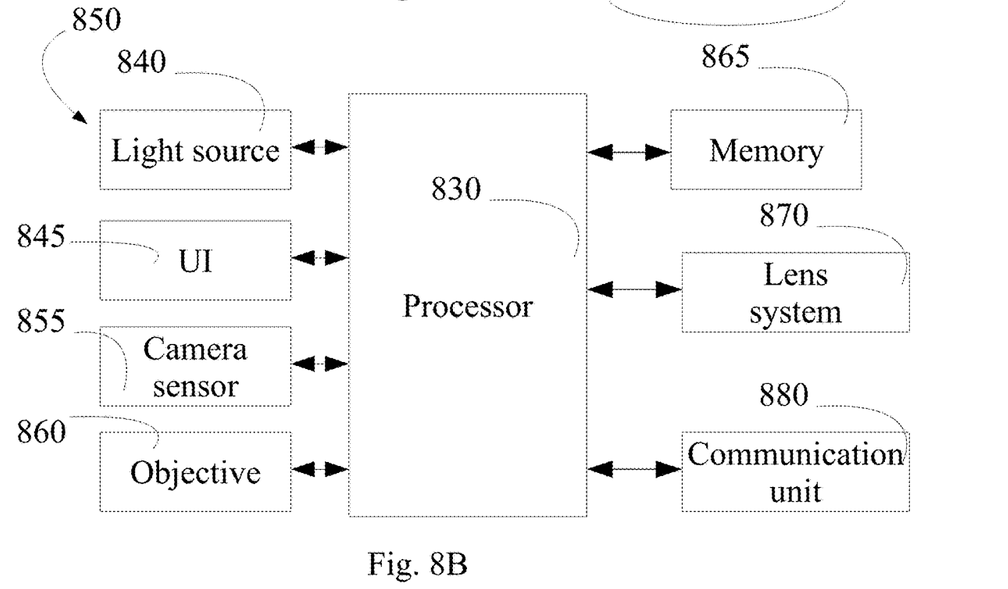
FIG. 8B shows, by way of example, a block diagram of an imaging device.

FIG. 8B shows, by way of example, a block diagram of an imaging device, e.g. a microscope scanner. The imaging device comprises a light source 840 for illuminating a specimen on a slide. The light source may be e.g. LED based light source configured to function as a flash. The flash may be a strobe flash, which produces a light pulse in synchronization with image capture. The light source produces light of different colours, e.g. red, green and blue. The light source may comprise LEDs with different colours, e.g. red LED(s), green LED(s), and blue LED(s). There may be LEDs with more different colours. For example, in case of 4 LEDs of different colours, two different LEDs may produce light at the same time. In this case, the number of illumination spectra may still be 3, but one of those represent a sum of illumination spectra of two different LEDs of different colours. Acquiring several frames each exposed with LED flash of a different colour enables proper focusing of different colours of the specimen. The imaging device comprises a lens system 870 comprising various lenses, e.g. a collector lens, a condenser lens and a tube lens. The imaging device comprises an objective 860 for collecting light from the specimen. The objective is characterized by its magnification and numerical aperture.

The imaging device comprises a camera sensor 855 for capturing images of the specimen. The camera sensor 855 may be e.g. a charge-coupled device (CCD) or a complementary metal-oxide semiconductor (CMOS). The sensor may be a monochrome sensor or a colour sensor.

In case of a monochrome sensor, the light source may be configured to provide narrowband illumination.

In case of a colour sensor, the light source may be configured to provide broadband illumination. The imaging device may comprise colour filters to filter light such that only certain wavelengths of light will impact the sensor. The colour filters may be divided into red, green and blue sub-filters. The colour filters may form a colour filter array, which may be e.g. a Bayer array.

The imaging device comprises or is connected to a user interface (UI) 845. A user may operate the imaging device via the user interface, which may comprise e.g. means for receiving user input, e.g. a keypad, a mouse and/or a touch screen, and means for displaying information, e.g. a display. The user interface may be realized e.g. with a personal computer or a smartphone. The imaging device comprises communication unit 880 for receiving and transmitting information, e.g. for receiving the colour transformation parameters. For example, the imaging device may be connected to the computer via the communication unit. The communication unit enables communication with other devices via wireless communication and/or wired communication. The imaging device comprises one or more processors 830, one or more memories 865 including computer program code. The one or more memories and the computer program code are configured to, with the one more processors, cause the imaging device to perform actions, e.g. perform scanning of a specimen. The colour transformation parameters may be stored in the memory 865 of the imaging device.

The imaging device may comprise other elements which are not shown in FIG. 8B. For example, the imaging device comprises motor(s) for moving a specimen stage and moving an objective-camera system. the motors may be operated by the one or more processors. As another example, the imaging device comprises a diaphragm comprising aperture(s) for regulating the amount of light that passes through towards a specimen.

Let us consider imaging devices with colour sensors. FIG. 3 shows LED illumination spectra and sensor sensitivity spectrum of a monochrome sensor. In case of colour sensors, the spectrum 300 would represent the illumination spectrum of a broadband light source, and the spectra 330, 320, and 310 would represent the spectral responses of the colour sensor. The spectrum 330 would represent a sensitivity spectrum of a red pixel, or in other words, a combined spectral response of a sensor pixel and a red colour filter. The spectrum 320 would represent a sensitivity spectrum of a green pixel, or in other words, a combined spectral response of a sensor pixel and a green colour filter. The spectrum 310 would represent a sensitivity spectrum of a blue pixel, or in other words, a combined spectral response of a sensor pixel and a blue colour filter. The combined spectral response may be achieved by a point-wise product of the transmission spectrum of a colour filter and a spectral response of a sensor pixel for broadband illumination. The combined spectral responses may be provided by manufacturer of the sensor, or they may be empirically determined.

In case of colour sensor, the equation 8, i.e. the recorded digital value C by the image sensor would be the same, but the illumination spectrum would be the spectrum of a broadband light source, and the image sensor sensitivity spectrum would comprise the combined spectral response $S_R(\lambda)$, $S_G(\lambda)$, or $S_B(\lambda)$, i.e. the spectral response of the red, green, or blue pixels of the sensor. The equations 9, 10, 11 would become:

$$R = k\int I(\lambda)T(\lambda)S_R(\lambda)d\lambda - b$$

$$G = k\int I(\lambda)T(\lambda)S_G(\lambda)d\lambda - b$$

$$B = k\int I(\lambda)T(\lambda)S_B(\lambda)d\lambda - b,$$

and represent digital values recorded by red, green and blue pixels.

The present disclosure provides a method for determining colour correction parameters for a digital imaging device, which improves the field of colour correction in digital imaging devices by utilizing a simulation method, which enables calibration of a digital imaging device without actual imaging of a calibration target, for example. The present disclosure constitutes an advance in digital imaging technology.

The invention claimed is:

1. A method for determining colour correction parameters for a digital imaging device, the method comprising:
    simulating target and raw value pairs for a set of colours based on
        pre-determined sample transmission spectra of the set of colours; and either
        i)—a sensitivity spectrum of a monochrome sensor of the digital imaging device; and
            illumination spectra of different colours of a light source of the digital imaging device; or
        ii)—sensitivity spectra of pixels of different colours of a colour sensor of the digital imaging device; and
            an illumination spectrum of a light source of the digital imaging device;
    determining a colour correction transformation for transforming the raw values to target values, wherein the colour correction transformation is parametrized by transformation parameters; and
    solving the transformation parameters for the colour correction transformation using an optimization problem.

2. The method of claim 1, further comprising providing the transformation parameters to the digital imaging device.

3. The method of claim 1, wherein the colour correction transformation has a form of a second order polynomial.

4. The method of claim 1,
    wherein the optimization problem is based on a loss function that measures a difference between the target values and transformed values, wherein the transformed values are obtained by applying the determined colour correction transformation to the raw values.

5. The method of claim 4, wherein the loss function is a squared 2-norm of the difference between the target values and the transformed values.

6. The method of claim 1, wherein the simulated target and raw value pairs are represented in CIELAB colour space.

7. The method of claim 1, wherein an image sensor of the digital imaging device is the monochrome sensor, and the illumination spectra comprises spectra of at least three different narrowband light sources.

8. The method of claim 1, wherein an image sensor of the digital imaging device is the colour sensor, and the sensitivity spectra comprises at least three different spectra comprising combined spectral responses of colour filters and pixels of the colour sensor; and
    wherein the illumination spectrum is of a broadband light source.

9. The method of claim 1, wherein the light source comprises one or more light emitting diodes.

10. The method of claim 1, wherein the digital imaging device is a microscope or a microscope scanner.

11. The method of claim 1, further comprising validating the obtained parameters for the colour correction transformation using target and raw value pairs determined using a calibration target.

12. The method of claim 1, further comprising simulating a subset of raw values to be included in the simulated raw values, wherein the subset of raw values is simulated based on
    pre-determined sample transmission spectra of the set of colours;
    a modified sensitivity spectrum or spectra of the image sensor;
    a modified illumination spectrum or spectra of the light source.

13. The method of claim 1, wherein a number of colours in the set of colours is at least a number of the transformation parameters for the colour correction transformation divided by three.

14. A non-transitory computer readable medium having stored thereon a set of computer readable instructions that, when executed by at least one processor, cause an apparatus to perform at least:
    simulating target and raw value pairs for a set of colours based on
        pre-determined sample transmission spectra of the set of colours;
        i) a sensitivity spectrum of a monochrome sensor of the digital imaging device; and
            illumination spectra of different colours of a light source of the digital imaging device; or
        ii)—sensitivity spectra of pixels of different colours of a colour sensor of the digital imaging device; and
            an illumination spectrum of a light source of the digital imaging device;
    determining a colour correction transformation for transforming the raw values to target values, wherein the colour correction transformation is parametrized by transformation parameters; and
    solving the transformation parameters for the colour correction transformation using an optimization problem.

15. The non-transitory computer readable medium according to claim 14, having stored thereon a set of readable instructions that, when executed by at least one processor, cause an apparatus to further perform providing the transformation parameters to the digital imaging device.

16. A digital imaging device, configured to
    receive transformation parameters for a colour correction transformation, wherein the transformation parameters are solved according to a method comprising;
        simulating target and raw value pairs for a set of colours based on
            pre-determined sample transmission spectra of the set of colours;
            i)—a sensitivity spectrum of a monochrome sensor of the digital imaging device; and
                illumination spectra of different colours of a light source of the digital imaging device; or
            ii)—sensitivity spectra of pixels of different colours of a colour sensor of the digital imaging device; and
                an illumination spectrum of a light source of the digital imaging device;

determining the colour correction transformation for transforming the raw values to target values, wherein the colour correction transformation is parametrized by transformation parameters; and solving the transformation parameters for the colour correction transformation using an optimization problem;

and the digital imaging device is further configure to apply the colour correction transformation with the transformation parameters to an image captured by the digital imaging device to obtain a colour corrected image.

17. The digital imaging device according to claim 16, comprising the monochrome sensor as an image sensor, and the illumination spectra comprises spectra of at least three different narrowband light sources.

18. The digital imaging device according to claim 16, comprising the colour sensor as an image sensor, and the sensitivity spectra comprises at least three different spectra comprising combined spectral responses of colour filters and pixels of the colour sensor;

and wherein the illumination spectrum is of a broadband light source.

19. The digital imaging device according to claim 16, wherein the digital imaging device is a microscope or a microscope scanner.

20. The digital imaging device according to claim 16, comprising one or more light emitting diodes as the light source.

\* \* \* \* \*

UNITED STATES PATENT AND TRADEMARK OFFICE
CERTIFICATE OF CORRECTION

Page 1 of 1

PATENT NO. : 11,006,088 B1
APPLICATION NO. : 17/087719
DATED : May 11, 2021
INVENTOR(S) : Matti Pellikka and Markus Vartiainen It is certified that error appears in the above-identified patent and that said Letters Patent is hereby corrected as shown below:

On the Title Page

Item (73), the Assignee:
"Grundium Oy, Tampere, FL, (US)"

Should be:
"Grundium Oy, Tampere, (FI)".

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*